United States Patent [19]

Morini et al.

[11] Patent Number: 5,529,850
[45] Date of Patent: Jun. 25, 1996

[54] FIBERS PRODUCED FROM CRYSTALLINE PROPYLENE POLYMERS HAVING HIGH MELT FLOW RATE VALUES AND A NARROW MOLECULAR WEIGHT DISTRIBUTION

[75] Inventors: Giampiero Morini, Voghera; Gianni Pennini, Porotto; Enrico Albizzati, Arona, all of Italy; Hee J. Yoo, New Castle County, Del.

[73] Assignee: Montell North America Inc., Wilmington, Del.

[21] Appl. No.: 440,282

[22] Filed: May 12, 1995

Related U.S. Application Data

[62] Division of Ser. No. 270,806, Jul. 5, 1994, Pat. No. 5,476,911.

[51] Int. Cl.$^6$ .......................... B32B 27/00; C08F 110/06
[52] U.S. Cl. .......................... 428/500; 525/240; 525/242; 525/253; 526/90; 526/124.6; 526/209; 526/348; 526/351
[58] Field of Search ..................... 428/224, 365, 428/288, 500; 525/240, 242, 253; 526/127, 124.6, 125, 90, 209, 348, 351

[56] References Cited

U.S. PATENT DOCUMENTS

| | | | |
|---|---|---|---|
| 4,665,118 | 5/1987 | Bourland | 524/394 |
| 4,971,937 | 11/1990 | Albuzzati et al. | 502/127 |
| 4,978,648 | 12/1990 | Barbe et al. | 502/127 |
| 5,427,845 | 6/1995 | Sawyer et al. | 428/288 |

FOREIGN PATENT DOCUMENTS

| | | |
|---|---|---|
| 320150 | 11/1985 | European Pat. Off. |
| 362705 | 4/1990 | European Pat. Off. |
| 361494 | 4/1990 | European Pat. Off. |
| 480190 | 9/1991 | European Pat. Off. |
| 2720701 | 11/1978 | Germany |

*Primary Examiner*—Paul J. Thibodeau
*Assistant Examiner*—Mary Critharis

[57] ABSTRACT

Crystalline propylene polymers having P.I. values lower than or equal to 3.7, and having, at an MFR (Melt Flow Rate) ranging from 600 to 1000 g/10 min., an Mw value from 100,000 to 60,000, and at a MFR ranging from 1000 to 2000 g/10 min., an Mz value higher than or equal to 140,000, are obtained by way of polymerization with specific supported catalysts.

14 Claims, No Drawings

FIBERS PRODUCED FROM CRYSTALLINE PROPYLENE POLYMERS HAVING HIGH MELT FLOW RATE VALUES AND A NARROW MOLECULAR WEIGHT DISTRIBUTION

This application is a division of application Ser. No. 08/270,806, filed Jul. 5, 1994 now U.S. Pat. No. 5,476,911.

The present invention concerns crystalline propylene polymers having an MFR (Melt Flow Rate according to ASTM D 1238L) ranging from 600 to 2000 g/10 min, and P.I. (Polydispersity Index) values lower than or equal to 3.7.

Crystalline propylene polymers having high MFR values, generally ranging from 300 to 1500 g/10, min. have found in recent years consistent use in some application sectors, thanks above all to their high fluidity in the molten state, and their good mechanical characteristics. Examples of said application sectors are the one concerning webs for nonwoven fabrics obtained by various processes for forming nonwoven webs, such as air-laid or carding processes, especially by way of melt blown or spun-bonded processes, or the one concerning composites with highly porous organic fillers, such as wood flour.

Crystalline propylene polymers having the above MFR characteristics have been prepared, up to now, by using two types of processes. The most commonly used one is based on thermodegradation (visbreaking) of crystalline propylene polymers obtained with stereospecific catalysts (Ziegler-Natta) and generally having MFR values ranging from 1 to 100, in particular from 1 to 10. Said thermodegradation process is carried out maintaining the polymers in the molten state, generally at temperatures ranging from 200° to 300° C., in the presence of radical generators, such as organic peroxides (such as 2,5-dimethyl-2,5[tert-butylperoxy]hexane, for example).

Thus the polymer chains are degraded in segments whose length can be controlled by choosing the proper conditions for the thermodegradation process. However, the above process has the disadvantage of altering considerably the physical and chemical structure of the initial propylene. In fact, the high MFR polymers obtained with said process present particularly low Mw and Mz molecular weight average values (measured by way of GPC—Gel Permeation Chromatography and the resulting MWD curves). Consequently there is a considerable decline of the physico-mechanical properties related to the molecular weights, such as flexural modulus and tensile properties.

Moreover, due to the high temperatures used and the presence of radicals, the above process causes secondary reactions that can bring to the formation of branched polymer chains containing double bonds.

Furthermore, commercial production of such high MFR polymers with the use of extruders is not economical due to extrusion and pelletization difficulties. Consistent product quality is also difficult to achieve because of poor MFR control.

Therefore, the polymers obtained by way of thermodegradation possess characteristics that can be disadvantageous, such as, for example, reduced resistance to heat and oxidation. Finally, the presence of the decomposition products of the free radical generators in the thermodegraded polymer may present additional disadvantages, in particular odor and food incompatibility problems, as revealed in published European patent application no. 442 412.

The other type of process, developed more recently, consists of obtaining high MFR polymers by way of polymerization of the propylene with high yield Ziegler-Natta catalysts supported on magnesium chloride, and operating in the presence of concentrations of hydrogen (used as molecular weight regulator) which gets higher as the desired MFR value increases.

In particular, according to published European patent application no. 320 150, one obtains high MFR propylene polymers by way of polymerization in gas phase with high yield catalysts particularly sensitive to hydrogen. In said catalysts, the sensitivity to hydrogen can be regulated in function of the electron-donor compounds used (internal and external electron-donors).

In fact, the examples of the above patent application show that:

1. when the internal electron-donor (i.e., the one supported on solid catalyst component containing titanium) is a phthalate, in particular diisobutyl phthalate, and the external electron-donor (i.e., the one added together with the Al-alkyl compound) is a silane, in particular diphenyldimethoxysilane, one can obtain propylene polymers with a high MFR;

2. when the internal electron-donor is a benzoate, in particular ethyl benzoate, and the external electron-donor is an aromatic carboxylic acid ester, in particular ethyl paraethoxy benzoate, the polymerization yields are very low, because in order to obtain high MFR values one needs to maintain the concentrations of hydrogen in gas phase too high; thus, the polymers obtained have an excessive content of catalytic residues, titanium and chlorine in particular.

It is known that the electron-donor couples mentioned in items (1) and (2) above are by far the most preferred ones for industrial use, given the high productivity and stereospecific values they confer to the Ziegler-Natta catalysts. It is obvious, therefore, that only thanks to the discovery of the phthalate/silane couple it has been possible to contemplate the industrial production of high MFR polypropylene directly in polymerization. As shown in the above mentioned patent application, at equal MFR, the polymers thus obtained have higher Mw values with respect to the corresponding polymers obtained by way of thermodegradation, and moreover, they have a relatively wide molecular weight distribution (MWD), which does not decrease significantly as the MFR values increase (their variation ranges from 22 to 764 g/10 min. in the examples). The main advantage represented by the wide MWD consists of the fact that is confers a high melt strength to the polymer, i.e., high viscosity in the molten state, which shows to be very advantageous for some extrusion, thermo-forming, and injection molding processes. However, broad MWD or the high melt strength can be a disadvantage for other application, such as fast spinning processes, in particular the melt-blown spinning processes.

As a matter of fact, broad MWD causes a swelling of the fibers obtained by extrusion (die-swell) and unwanted breaking of said fibers during spinning, followed by shrinking and swelling phenomena. Because of these phenomena, the sectioning and length of the fibers are hard to control, and the physical-mechanical properties of fibers or the webs and fabrics produced with such fibers are poor.

Published European patent application no. 480 190, teaches how to prepare propylene polymers with low molecular weight and high MFR by using a high yield catalyst where the internal electron-donor is a phthalic acid derivative (di-n-butyl phthalate in particular), and the external electron-donor is a silane (in particular dimethoxy isobutyl isopropyl silane). The examples of said patent application show that when the molecular weight decreases (thus causing an increase in the MFR), the crystallinity of the polymer, expressed in terms of fraction insoluble in xylene, decreases drastically reaching values which are lower than 90%.

Published European patent applications n, 361 494 and 362 705 on behalf of the Petitioner, describe catalysts for the polymerization of olefins characterized by the presence of specific di- or polyesters as internal or external electron donors.

The Petitioner has now found that by using the catalysts of the above mentioned European patent application nos. 361 494 and 362 705, or other catalysts which will be described below, containing the above di- or polyesters, one can obtain directly in polymerization propylene polymers with high MFR values, and their yields are such that they allow to keep the catalytic residues low.

As in the case of polymers obtained with phthalate and silane based catalysts, the polymers thus obtained have Mw and Mz values considerably higher with respect to those of the polymers produced by thermodegradation, and therefore their mechanical properties are improved compared to the latter type. In particular, at high MFR values (ranging from 1000 to 2000 dl/g), the polymers of the present invention show Mz values considerably higher than those found in the polymers obtained by thermodegradation. Moreover, at high MFR values, the polymers of the present invention have a constantly narrower MWD and higher crystallinity compared to the polymers obtained with phthalate and silane based catalysts. As previously stated, a narrow MWD is desirable for certain applications, such as the production of fibers with fast spinning processes; moreover, the higher crystallinity provides the polymers with improved mechanical properties, such as increased stiffness.

Therefore, the present invention provides crystalline homopolymers and copolymers of propylene containing up to 15% in moles, preferably up to 10% in moles, of ethylene and/or $C_4$-$C_8$ α-olefins, said homopolymers and copolymers having P.I. values lower than or equal to 3.7, preferably lower than or equal to 3.5, more preferably to 3.3, and having, at an MFR ranging from 600 to 1000 g/10 min, preferably from 800 to 1000 g/10 min, Mw values ranging from 100,000 to 60,000, preferably from 100,000 to 70,000, and at an MFR ranging from 1000 to 2000 g/10 min, Mz values higher than or equal to 140,000 (generally comprised between 140,000 and 220,000), preferably higher than or equal to 150,000. As it will be explained in greater detail further on, the P.I. (Polydispersity Index) is a parameter obtained by way of rheologic measures, which is correlated to the polymer's MWD. In particular, the lower the P.I. values the narrower the MWD. The polymers with high MFR obtained with phthalate and silane based catalysts show P.I. values from 3.8 to 4; the minimum P.I. values that can be obtained in the polymers of the present invention are in the order of 2.5 ca. Thus the P.I. values generally are from about 2.5 to less than or equal to 3.7, preferably from about 2.5 to less than or equal to 3.5 and more preferably from about 2.5 to less than or equal to 3.3. The values of the Mw/Mn ratio are not referred to in this invention because it has been found that the Mn values measured with the GPC are not accurate. In terms of Mz/Mw ratio, the most preferred values for the polymers of the present invention are from 2.5 to 2.8, while with a MFR is from 600 to 2000 g/10 min, the values for the polymers obtained by way of thermodegradation are from 2 to 2.4, and for the polymers obtained with phthalate and silane-based catalysts the values are from 3 to 4. Moreover, the melting point for the homopolymers of the present invention is typically higher than or equal to 150° C. (measured by way of DSC), and an isotactic index (insoluble in xylene at 25° C.) preferably higher than or equal to 95%, more preferably higher than or equal to 97%. It is particularly surprising that the above isotactic index values are obtained throughout the entire MFR range mentioned above, when one considers that operating with phthalate and silane-based catalysts, the resulting isotactic index values are considerably lower compared to MFR levels that are higher than or equal to 1000 g/10 min. (corresponding to intrinsic viscosity values lower than 0.5 dl/g), as shown in the examples of published European patent application no. 480 190. In the case of propylene copolymers included in the definition of the present invention, the $C_4$–$C_8$ α-olefins are preferably chosen from 1-butene, 1-pentene, 1-hexene, 4-methyl-1-pentene, 1-octene. Whenever present, the ethylene content ranges from 1% to 5% in moles. The catalysts used in the process for the preparation of the polymers of the present invention comprise the reaction product of:

A) a solid catalyst component comprising an active magnesium halide and, supported on the latter, a titanium compound containing at least one Ti-halogen bond and an electron-donor compound selected among the ethers containing two or more ether functions, and characterized in that under standard conditions, they complex with anhydrous magnesium chloride for at least 60 mmoles per 100 g of chloride, and with the TlC14 they do not cause substitution reactions, or they do so only at a rate lower than 50% in moles;

B) an Al-alkyl compound; and optionally

C) an electron-donor compound selected from 2,2,6,6-tetramethylpiperidine or silicon compounds containing at least one Si-OR bond, where R is a hydrocarbon radical.

The above mentioned catalysts [hereinafter referred to as catalysts (I)] are described in published European patent application no. 361 494, attached for reference.

Other catalysts used in the preparation process of the polymers of the present invention comprise the reaction product of:

A') a solid catalyst component comprising an anhydrous magnesium halide in active form, on which are supported a titanium compound containing at least one Ti-halogen bond, and an electron-donor compound which can be extracted from the solid with Al-triethyl for at least 70% in moles, said solid having a surface area greater than 20 m$^2$/g after extraction;

B') an Al-alkyl compound;

C') an ether containing two or more ether functions and having the property of complexing with anhydrous magnesium chloride, under standard reaction conditions, for at least 60 mmoles per 100 g of-chloride. The above catalysts [hereinafter referred to as catalysts (II)] are described in published European patent application no. 362 705, attached for reference.

Another class of catalysts [hereinafter referred to as catalysts (III)], that can be used in the preparation of the polymers of the present invention comprises the reaction product of components (A), (B), and (C') described above.

The ethers used in the preparation of catalysts (I), (II), and (III) answer to the reaction criteria previously defined, and are amply described in the above mentioned European patent applications.

The tests that allow one to verify said reaction criteria are set forth below.

Ethers/MgCl$_2$ complexing test

In a 100 ml glass flask complete with a fixed-blade mechanical agitator are introduced, in nitrogen atmosphere and in order:

70 ml anhydrous n-heptane 12 mmoles anhydrous MgCl$_2$ activated as described below 2 mmoles ether.

The content is allowed to react for 4 hours at 60° C. (agitation speed 400 rpm), after which it is filtered and washed with 100 ml n-heptane at ambient temperature, then dried by using a mechanical pump. After treatment with 100 ml of ethanol, the solid is characterized by way of quantitative gaschromatography in order to determine the quantity of ether fixed on it.

Reactivity test with TiCl$_4$ [for the ethers supported on catalyst component (A)].

In a 25 ml test-tube complete with magnetic agitator are introduced, in nitrogen atmosphere and in order:

10 ml anhydrous n-heptane 5 mmoles TiCl$_4$ 1 mmole donor

The content is allowed to react at 70° C. for 30 minutes, after which it is cooled to 25° C. and decomposed with 90 ml of ethanol.

The solutions obtained are analyzed by way of gas chromatography, using the internal standard method, with a Carlo Erba HRGC 5300 Mega Series gas chromatograph complete with Chrompack CP-SIL CB capillary column 25 meters long.

The magnesium chloride used in the ether complexing test is prepared as follows.

In the jar of a vibrating mill (Vibratom by Siebtechnik) having a 1 liter capacity, containing 1.8 kg of stainless steel spheres with a 16 mm diameter, are introduced, in nitrogen atmosphere, 50 g of anhydrous MgCl$_2$ and 6.8 ml of 1,2-dichloroethane (DCE). The content is milled at ambient temperature for 96 hours, after which the solid recovered is kept under vacuum by using a mechanical pump for 16 hours at 50° C.

Characterization of the solid

Width at half-peak of the D110 reflection=1.15 cm

Presence of a halo with maximum intensity at 2θ=32.1°

Surface area (B.E.T.)=125 m$^2$/g

Residual DCE=2.5% by weight.

Examples of preferred ethers to be used for the supported catalyst components (A) [catalysts (I) and (III)], as well as catalyst components (C') [catalysts (II) and (III)] are the diethers of formula

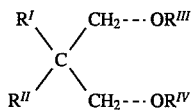

where R$^I$, R$^{II}$, equal or different, are C$_1$–C$_{18}$ alkyl, C$_3$–C$_{18}$ cycloalkyl, or C$_6$–C$_{18}$ aryl radicals; R$^{III}$ or R$^{IV}$, equal or different, are alkyl radicals with 1–4 carbon atoms.

Examples representative of said compounds are 2-isopropyl-2-isoamyl-1,3-dimethoxypropane, 2,2-diisobutyl-1,3-dimethoxypropane, 2-isopropyl-2-cyclopentyl-1,3-dimethoxypropane, 2,2-diisopropyl-a,3-dimethoxypropane.

Examples of solid catalyst components (A') [catalysts (II)] are described in U.S. Pat. No. 4,522,930, and said description is included here for reference. As already stated, the above catalyst components comprise a titanium compound containing at least one Ti-halogen bond and an electron-donor compound capable of being extracted with Al-triethyl, under standard extraction conditions, for at least 70% in moles.

After extraction, the solid has a surface area (B.E.T.) of at least 20m$^2$/g and generally ranging from 100 to 300 m$^2$/g. The electron donor compounds that may be used in the preparation of the catalyst components described in the USA patent comprise ethers, ketones, lactones, electron-donor compounds containing N, P, and/or S atoms, and specific esters.

Besides the esters in U.S. Pat. No. 4,522,930, one can also use the classes of esters described in European patent no. 45977.

Particularly suited are the phthalic acid esters, such as diisobutyl, dioctyl and diphenyl phthalate, benzyl butyl phthalate; the malonic acid esters such as diisobutyl and diethyl malonate; alkyl and aryl pivalate, alkyl, cycloalkyl and aryl maleate, alkyl and aryl carbonates such as diisobutyl carbonate, ethyl-phenyl carbonate, and diphenyl carbonate; succinic acid esters such as mono and diethyl succinate. The phthalic acid esters are the preferred donors.

Catalyst components (A) and (A') mentioned above are prepared using several methods.

For example, the magnesium halide (used in the anhydrous state containing less than 1% water), the titanium compound and the electron-donor compound can be milled together under conditions where the magnesium halide is activated; the milled product is then treated one or more times with excess TiCl$_4$ at a temperature ranging from 80° to 135° C., and washed repeatedly with a hydrocarbon (like hexane for example) until all chlorine ions have disappeared.

According to another method the anhydrous magnesium halide is preactivated with known methods, and then caused to react with excess TiCl$_4$ containing the electron-donor compound in solution. The temperature during this operation also ranges from 80° to 135° C. Optionally the treatment with TiCl$_4$ is repeated, and the solid is then washed with hexane or another hydrocarbon solvent to eliminate all traces of nonreacted TiCl$_4$.

Following yet another method a MgCl$_2$.nROH adduct (particularly in the form of spheroidal particles) where n is generally a number from 1 to 3, and ROH is preferably ethanol, butanol, or isobutanol, is caused to react with excess TiCl$_4$ containing the electron-donor compound in solution. The temperature generally ranges from 80° to 120° C. The solid is then isolated and caused to react once more with TiCl$_4$, then separated and washed with a hydrocarbon until all chlorine ions have disappeared.

Preparation methods of this type are described in U.S. Pat. No. 4,399,054.

It is also possible to support the magnesium halide on porous supports such as inorganic oxides (silica or alumina for example), and styrene resins. Examples of catalyst components obtained by supporting the magnesium on porous inorganic oxides are given in published European patent application nos. 437,264 and 506,074.

Styrene resins and their use as supports are described in European patent application nos. 283,011 and 506,073.

According to another method, magnesium alcoholates and chloroalcoholates (the chloroalcoholates prepared particularly according to the method described in U.S. Pat. No. 4,220,554) are caused to react with excess TiCl$_4$ containing the electron-donor compound in solution, operating under the reaction conditions described above.

In the solid catalyst component, the titanium compound expressed as Ti is generally present in a percentage by weight ranging from 0.5 to 10%; the quantity of electron-donor compound which remains fixed on the solid (internal donor) is generally of 5 to 20% in moles with respect to the magnesium dihalide.

The titanium compounds which can be used for the preparation of the catalyst components are halide and halogen alcoholates. Titanium tetrachloride is the preferred compound.

Satisfactory results can be obtained also with titanium trihalides, particularly $TiCl_3$ HR, $TiCl_3$ ARA, and with halogen alcoholates such as $TiCl_3OR$ where R is a phenyl radical.

The reactions indicated above bring to the formation of activated magnesium halide. In the literature, besides the ones just mentioned, other reactions are known which bring to the formation of activated magnesium halide starting from magnesium compounds different from the halides, such as, for example, the magnesium carboxylates.

The activity of the magnesium halides in the solid catalyst components can be recognized by the fact that in the X-ray spectrum of the catalyst component, the maximum intensity reflection which appears in the spectrum of the nonactivated magnesium halides (with a surface area of less than 3 $m^2/g$) is no longer present, but in its place there is a halo with the maximum intensity shifted with respect to the position of the maximum intensity reflection of the nonactivated magnesium dihalide, or by the fact that the maximum intensity reflection presents a width at half-peak at least 30% greater than the one of the maximum intensity reflection which appears in the spectrum of the nonactivated Mg halide.

The most active forms are those where the X-ray spectrum shows a halo.

Chloride is the preferred compound among the magnesium halides. In the case of the most active forms of Mg chloride, the X-ray spectrum of the catalyst component shows a halo in place of the reflection which appears at the distance of 2.56 Å in the spectrum of the nonactivated chloride.

Al-alkyl compounds which can be used as co-catalysts (B) include the Al-trialkyls, such as Al-triethyl, Al-triisobutyl, Al-tri-n-butyl, and linear or cyclic Al-alkyl compounds containing two or more Al atoms bound between them by O or N atoms, or by $SO_4$ and $SO_3$ groups.

Examples of said compounds are:

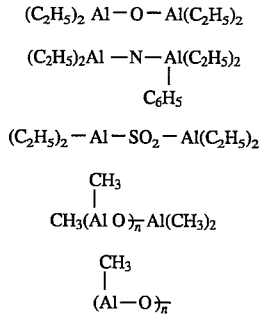

where n is a number from 1 to 20.

The Al-alkyl compound is generally used in such quantities as to cause the Al/Ti ratio to be from 1 to 1000.

As previously stated, catalyst component (C) [catalyst (I)] is selected from silicon compounds containing at least one Si-OR bond (R=hydrocarbon radical), and 2,2,6,6-tetramethyl piperidene.

Examples of silicon compounds are (tert-butyl)$_2$—Si(OCH$_3$)$_2$, (cyclohexyl)$_2$Si(OCH$_3$)$_3$, (phenyl)$_2$Si(OCH$_3$)$_2$.

Generally speaking, the electron-donors (C) and (C') are used in quantities ranging from 0.002 to 1 mole with respect to the moles of the Al-alkyl (B) compound.

The polymerization process can be carried out in continuous or in batch, according to known techniques, operating in liquid phase, in the presence or not of inert diluent, or in gas phase, or using a combination of liquid and gas techniques.

Hydrogen is used preferably as molecular weight regulator. Given the sensitivity to hydrogen of the catalysts described above, one can prepare polymers with an MFR higher than or equal to 600 g/10 min. even when operating in liquid monomer, where the concentration of hydrogen is limited by its solubility. On the other hand, the high activity and sensitivity to hydrogen of the above catalysts allow one to operate in gas phase obtaining polymers with low catalytic residues, in particular less than 10 ppm of titanium, and less than 90 ppm of chlorine.

The higher the desired MFR value, the greater the quantity of molecular weight regulator, hydrogen in particular, which is used in polymerization.

Said quantity can be easily determined by experimenting; generally speaking, it ranges from 0,005 to 0.02 moles per mole of monomer in the case of polymerization in liquid monomer, and from 0.08 to 0.18 moles per mole of monomer in gas phase polymerization.

Polymerization reaction time and temperature are not critical; however, it is best if the temperature ranges from 20° to 100° C.

The catalysts can be precontacted with small quantities of olefins (prepolymerization). Prepolymerization is achieved by maintaining the catalyst in suspension in a hydrocarbon solvent (hexane or heptane, for example), and polymerizing at a temperature ranging from ambient to 60° C. for a time sufficient to produce quantities of polymer from 0.5 to 3 times the weight of the solid catalyst component. It can also be done in liquid propylene, at the temperature conditions indicated above, producing quantities of polymer which can reach 1000 g per g of catalyst component.

In addition to the characteristics described above, the polymers of the present invention, obtained with the above mentioned catalysts, do not show any inversion at the NMR analysis. Moreover, since they are obtained directly in polymerization, said polymers are in the form of nonextruded particles, and this form can be easily regulated because it depends on the form of the solid catalyst component (A) or (A') which is duplicated by the polymer.

The preferred spherical or spheroidal particles are those having a diameter ranging from 0.5 to 4.5 mm, and preferably a narrow particle size distribution, i.e., where the diameter of at least 90% of the particles range from 0.5 to 3.5 mm. This type of particles can be obtained, for example, by using a solid catalyst component prepared according to the process described in the above mentioned U.S. Pat. No. 4,499,054.

The following examples are given in order to illustrate and not limit the present invention. The properties of the polymers reported in the examples have been measured according to the following methods.

| Property | Method |
| --- | --- |
| MFR | ASTM D 1238 L |
| Intrinsic viscosity | Determined in tetrahydronaphthalene at 135° C. |
| Mw/Mz | Measured by way of Gel Permeation Chromatography in o-dichlorobenzene at 135° C. |
| Melt point | Determined by way of DSC (Differential Scanning Calorimetry). The samples were previously melted |

-continued

| Property | Method |
|---|---|
| | by increasing the temperature to 200° C., and maintained at said temperature for 5 minutes. They were then cooled to 50° C., and subsequently reheated to the complete melting point. Both during the heating and cooling operation the temperature was changed at a rate of 10° C./min. The melt temperatures reported refer to the top peak of the DSC curves obtained during the second melt. |
| Insoluble in xylene | see note below |
| P.I. (Polydispersity Index) | see note below |

NOTE: DETERMINATION OF THE PERCENTAGE OF INSOLUBLE IN XYLENE 2.5 g of polymer are dissolved in 250 ml of xylene at 135° C. under agitation. After 20 minutes the solution is allowed to cool to 25° C., still under agitation, and then allowed to rest for 30 minutes.

The precipitate is filtered with filter paper, the solution evaporated in nitrogen flow, and the residue dried under vacuum at 80° C. until constant weight is reached. Thus one calculates the percentage by weight of the polymer soluble in xylene at ambient temperature. The percentage by weight of polymer insoluble in xylene at ambient temperature is considered to be the polymer's isotactic index. The value thus obtained corresponds basically to the isotactic index determined by way of extraction in boiling n-heptane, which by definition constitutes the isotactic index of polypropylene.

DETERMINATION OF THE POLYDISPERSITY INDEX (P.I.)

This property, strictly connected with the molecular weight distribution in the polymer under examination, is inversely proportional to the creep resistance of the polymer in the molten state. Said resistance, called modulus separation at a low modulus value, e.g., 500 Pa, is determined at a temperature of 200° C. by using a parallel-plates rheometer model RMS-800 marketed by RHEOMETRICS (USA), operating at an oscillation frequency which increases from 0.1 rad/second to 100 rad/second. From the modulus separation value, one can derive the P.I. by way of the equation:

P.I.=54.6, (modulus separation)$^{1.76}$ in which the modulus separation is defined as:

$$\text{modulus separation} = \frac{\text{frequency at } G' = 500 \text{ Pa}}{\text{frequency at } G'' = 500 \text{ Pa}}$$

wherein G' is the storage modulus and G" is the low modulus.

EXAMPLE 1

Preparation of solid catalyst component

In a 500 ml reactor complete with porous barrier are introduced at 0° C. 225 ml of $TiCl_4$. While stirring one adds, in 15 minutes, 10.3 g of microspheroidal $MgCl_2.2'1C_2H_5OH$ obtained as described below. At the end of the addition the temperature is brought to 70° C., 9 mmoles of 2-isopropyl-2-isoamyl-1,3-dimethoxypropane are added and the content is heated to 100° C. allowing it to react at this temperature for two hours, after which the $TiCl_4$ is filtered out. 200 ml of $TiCl_4$ are added and the content is allowed to react at 120° C. for one hour, after which it is filtered and washed at 60° C. with anhydrous heptane until all chlorine ions have disappeared from the filtrate.

The analysis of the solid component shows that it contains 17.4% by weight of Mg, 2.8% of Ti, and 164% of diether.

The microspheroidal $MgCl_2.2'1C_2H_5OH$ adduct is prepared as follows.

48 g of anhydrous $MgCl_2$, 77 g of anhydrous $C_2H_5OH$, and 830 g of kerosene are introduced, under inert gas and at ambient temperature, in a 2 liter autoclave complete with turbine agitator and dip pipe. The content is heated to 120° C. while under agitation, and the adduct is formed between $MgCl_2$ and the alcohol that melts and remains mixed to the dispersing agent. A nitrogen pressure of 15 atm is maintained inside the autoclave. The autoclave's dip-pipe is externally heated to 120° C. by way of a heating jacket, and it has a 1 mm inside diameter and its length, from end to end of the heating jacket, is 3 meters.

The mixture is circulated through the pipe at a velocity of 7 m/sec.

The dispersion is gathered in a 5 liter flask, under agitation, said flask containing 2.5 liter of kerosene, and being externally cooled by way of a jacket maintained at the initial temperature of –40° C.

The final temperature of the emulsion is 0° C. The spherical solid product that constituted the dispersed phase of the emulsion is separated by settling and filtration, then washed with heptane and dried.

All the above operations are carried out in an inert gas atmosphere.

130 g of $MgCl_2.2'1C_2H_2OH$ are obtained in the form of solid spherical particles with a maximum diameter of less than 50 microns. The product is then dealcoholized at temperatures which are gradually increased from 50° C. to 100° C. in nitrogen flow until the alcohol content reaches 2.1 moles per mole of $MgCl_2$.

Propylene polymerization

In a 4 liter stainless steel autoclave equipped with anchor agitator, and previously purged by way of nitrogen flow at 70° C. for 1 hour, are introduced, in propylene flow at 30° C., 80 ml of anhydrous n-hexane containing 7 mg of solid catalyst component, and 7 mmoles of $AlEt_3$. The autoclave is closed, and 19 liters of hydrogen are introduced. The agitator is put in motion, and 1.2 kg of liquid propylene are fed. The temperature is brought to 70° C. in 5 minutes, and the content is polymerized at this temperature for two hours, after which the nonreacted propylene is removed, the polymer is recovered, dried in a 70° C. oven in nitrogen flow for 3 hours, and then characterized.

588 g of polymer (corresponding to a yield of 84/kg/gCat) are obtained, said polymer having the following properties:

| | |
|---|---|
| MFR | 900 g/10 min |
| Intrinsic viscosity | 0.5 dl/g |
| Mw | 72800 |
| Mz | 183000 |
| Melt point | 158° C. |
| Insoluble in xylene | 96.3% |
| P.I. | 3.2 |
| Ti | <1 ppm |
| Cl | 7 ppm |

COMPARATIVE EXAMPLE 1

Preparation of solid catalyst component

One operates as in Example 1, using 6.75 mmoles of diisobutylphthalate instead of diether. When analyzed, the solid component showed the following contents by weight: 19.1% Mg, 2.8% Ti, and 9.7% of diisobutylphthalate.

Propylene Polymerization

The procedure and ingredients of Example 1 are followed, using 15 mg of the solid catalyst component prepared as described above, and adding, in addition to the AlEt$_3$, 0.7 mmoles of phenyltriethoxysilane. 20 liters of hydrogen are used.

398 g of polymer (corresponding to a yield of 26.5/kg/gCat) are obtained, said polymer having the following properties:

| | |
|---|---|
| MFR | 900 g/10 min |
| Intrinsic viscosity | 0.54 dl/g |
| Mw | 76000 |
| Mz | 227000 |
| Melt point | 158° C. |
| Insoluble in xylene | 96.5% |
| P.I. | 3.8 |
| Ti | 1 ppm |
| Cl | 24 ppm |

EXAMPLE 2

Propylene's Polymerization

The polymerization is carried out in continuous process, in gas phase, using two fluid-bed reactors in series, equipped with the means for transferring the product coming from the first reactor to the second reactor. In the gas phase, the hydrogen and the monomer are continuously analyzed and fed, in order to maintain constant the desired concentrations. Prior to the polymerization stage, the solid catalyst component (prepared as in Example 1) is contacted with Aluminum triethyl (TEAL) in quantities that will bring the TEAL/Ti molar ratio to 68 in a reactor maintained at 10° C. for 20 minutes. The catalyst thus obtained is then transferred in a reactor containing an excess of liquid propylene, and is prepolymerized for 10 minutes at 20° C. The polymer is then transferred in the first reactor in gas phase for the first polymerization stage, after which the polymer obtained is transferred to the second reactor in order to complete the polymerization. The TEAL/Ti molar ratio maintained during the polymerization is 68.

The polymerization conditions are set forth in Table 1. The yield is 7 kg/g Cat, and the polypropylene has the following properties:

| | |
|---|---|
| MFR | 1500 g/10 min |
| Intrinsic viscosity | 0.35 dl/g |
| Mw | 57000 |
| Mz | 158000 |
| Melt point | 156° C. |
| Insoluble in xylene | 97.2% |
| P.I. | 3.0 |
| Ti | 4 |
| Cl | 80 |

TABLE 1

| FIRST REACTOR IN GAS PHASE | |
|---|---|
| Temperature, °C. | 70 |
| Pressure, atm | 18 |
| Residence time, min. | 80 |
| H$_2$/C$_3$ (mol.) | 0.15 |

TABLE 1-continued

| SECOND REACTOR IN GAS PHASE | |
|---|---|
| Temperature, °C. | 95 |
| Pressure, atm | 20 |
| Residence time, min. | 140 |
| H$_2$/C$_3$ (mol.) | 0.1 |

The crystalline propylene homopolymers and copolymers of this invention can be readily spun into fibers or filaments and the fibers or filaments thus produced can be used to make fibrous webs, particularly nonwoven fibrous webs. The webs can be used to produce fabrics, especially nonwoven fabrics. The webs and fabrics produced from such fibers by melt-blown processes have superior barrier properties over webs and fabrics produced from fibers obtained from polymer produced by thermal degradation processes or by known polymerization processes using known catalysts. The webs and fabrics produced from such fibers by spun-bonded processes have superior tensile strength and softness over webs and fabrics produced from fibers obtained from polymer produced by thermal degradation processes or by known polymerization processes using known catalysts.

Other features, advantages and embodiments of the invention disclosed herein will be readily apparent to those exercising ordinary skill after reading the foregoing disclosures. In this regard, while specific embodiments of the invention had been described in considerable detail, variations and modifications of these embodiments can be effected without departing from the spirit and scope of the invention as described and claimed.

What is claimed is:

1. A fiber produced from crystalline propylene homopolymers and copolymers comprising up to 15% in moles of ethylene and/or C$_4$–C$_8$ α-olefins, having polydispersity index values of 2.5 to 3.7, a MFR of from 600 to 2000 g/10 min., Mw values from 100,000 to 60,000 when the MFR is 600 to 1000 g/10 min., Mz values higher than or equal to 140,000 when the MFR is from 1,000 to 2,000 g/10 min. and produced by polymerization in the presence of a catalyst consisting essentially of the reaction product of:

I. (A) a solid catalyst component containing an active magnesium halide and supported thereon, a titanium compound containing at least one Ti-halogen bond and an ether electron-donor compound containing two or more ether functions which under standard conditions, (i) complexes with anhydrous magnesium chloride for at least 60 mmoles per 100 g of chloride and (ii) either does not cause substitution reactions with TiCl$_4$, or does so only at a rate lower than 50 mole %;

(B) an Al alkyl compound; and optionally, (C) an electron-donor compound selected from the group consisting of 2,2,6,6-tetramethyl-piperidine and a silicon compound containing at least one Si-OR bond, where R is a hydrocarbon radical; or II. (A') a solid catalyst component comprising an active magnesium halide having supported thereon a titanium compound containing at least one Ti-halogen bond and an electron-donor compound at least 70 mole % of which can be extracted from the solid component with triethyl aluminum, said solid component having a surface area greater than 20 m$^2$/g after said extraction;

(B') an Al alkyl compound; and (C') an ether electron-donor compound containing two or more ether functions which, under standard conditions, complexes with anhydrous magnesium chloride for at least 60 mmoles per 100 g of chloride;

or in the presence of catalyst I. above, using a quantity of hydrogen from 0.005 to 0.02 moles per mole of monomer when polymerization is in liquid monomer, and from 0.08 to 0.18 mole per mole of monomer when polymerization is in gas phase.

2. A fiber produced from the crystalline propylene homopolymers and copolymers of claim 1 having an MFR ranging from 800 to 1000 g/10 min., Mw values from 100,000 to 70,000.

3. A web produced from the fiber of claim 1.

4. A web produced from the fiber of claim 2.

5. The web of claim 3 wherein the web is nonwoven.

6. The web of claim 4 wherein the web is nonwoven.

7. A fabric material produced from the web of claim 3.

8. A fabric material produced from the web of claim 4.

9. A fabric material produced from the web of claim 5.

10. A fabric material produced from the web of claim 6.

11. The web of claim 3 wherein the web is produced by a melt-blown or spun-bonded process.

12. The web of claim 4 wherein the web is produced by a melt-blown or spun-bonded process.

13. The web of claim 5 wherein the web is produced by a melt-blown or spun-bonded process.

14. The web of claim 6 wherein the web is produced by a melt-blown or spun-bonded process.

* * * * *